United States Patent [19]
Watanabe et al.

[11] Patent Number: 4,755,672
[45] Date of Patent: Jul. 5, 1988

[54] RADIATION IMAGE REPRODUCING METHOD AND APPARATUS

[75] Inventors: Hideo Watanabe; Nobuyoshi Nakajima, both of Kanagawa, Japan

[73] Assignee: Fuji Photo Film Co., Ltd., Kanagawa, Japan

[21] Appl. No.: 732,211

[22] Filed: May 9, 1985

[30] Foreign Application Priority Data

May 9, 1984 [JP] Japan ................................. 59-92629

[51] Int. Cl.$^4$ .............................................. G03C 5/16
[52] U.S. Cl. ............................... 250/327.2; 250/484.1
[58] Field of Search ............ 250/327.2, 484.1, 363 SE

[56] References Cited

U.S. PATENT DOCUMENTS

| | | | |
|---|---|---|---|
| 4,115,694 | 9/1978 | Lange et al. | 250/369 |
| 4,590,517 | 5/1986 | Kato et al. | 250/484.1 |

FOREIGN PATENT DOCUMENTS

| | | |
|---|---|---|
| 56599 | 7/1982 | European Pat. Off. |
| 79751 | 5/1983 | European Pat. Off. |
| 89665 | 9/1983 | European Pat. Off. |
| 2450471 | 5/1986 | France |
| 2057221 | 7/1979 | United Kingdom |

Primary Examiner—Carolyn E. Fields
Attorney, Agent, or Firm—Sughrue, Mion, Zinn, Macpeak, and Seas

[57] ABSTRACT

In a radiation image recording and reproducing system, preliminary image recording is conducted by exposing a stimulable phosphor sheet to a radiation prior to object image recording without making the radiation pass through an object, and a preliminary image signal obtained by image read-out from the stimulable phosphor sheet after the preliminary image recording is stored. After the object image recording, a visible image of the object is reproduced by use of an electric image signal obtained by subtracting the stored preliminary image signal multiplied by a predetermined constant from an electric image signal obtained by image read-out from the stimulable phosphor sheet subjected to the object image recording.

5 Claims, 1 Drawing Sheet

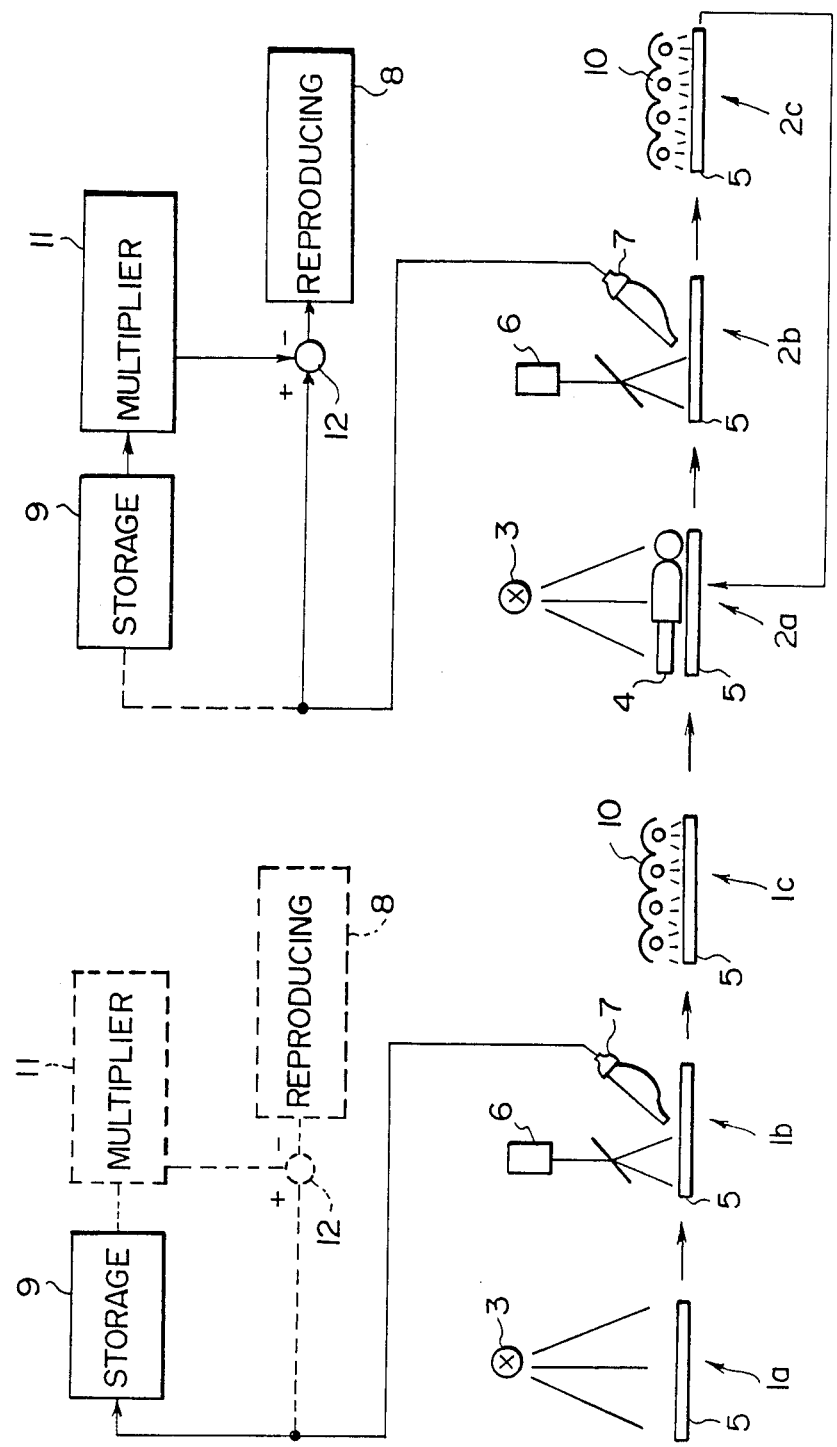

RADIATION IMAGE REPRODUCING METHOD AND APPARATUS

BACKGROUND OF THE INVENTION

1. Field of the Invention

This invention relates to a method of reproducing a radiation image in a radiation image recording and reproducing system using a stimulable phosphor sheet, and an apparatus for carrying out the method.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted to the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic film or on a display device such as a cathode ray tube (CRT).

In the aforesaid radiation image recording and reproducing system, a visible image is reproduced on the basis of the electric image signal obtained by read-out of the radiation image stored in the stimulable phosphor sheet.

However, sensitivity of the stimulable phosphor sheet is not always uniform over the whole surface thereof, and is often different among various portions of the stimulable phosphor sheet. Also, in the image read-out means, light detecting efficiency for the light emitted by the stimulable phosphor sheet is not always uniform over the whole surface of the stimulable phosphor sheet, and is often different among various portions of the stimulable phosphor sheet.

Therefore, the visible image reproduced on the basis of the electric image signal obtained by image readout involves nonuniformity of sensitivity in the stimulable phosphor sheet, the image read-out means or the like.

SUMMARY OF THE INVENTION

The primary object of the present invention is to provide a method of reproducing a radiation image in a radiation image recording and reproducing system so that deterioration in image quality of a reproduced visible image caused by nonuniformity of sensitivity of a stimulable phosphor sheet and nonuniformity of light detecting efficiency of a read-out means is eliminated or decreased.

Another object of the present invention is to provide a method of reproducing a radiation image in a radiation image recording and reproducing system, which is suitable particularly for a built-in type radiation image recording and reproducing system in which stimulable phosphor sheets are circulated in a housing to be repeatedly used for recording radiation images.

The specific object of the present invention is to be provide an apparatus for carrying out the method.

The present invention provides a method of reproducing a radiation image in a radiation image recording and reproducing system in which object image recording is conducted by exposing a stimulable phosphor sheet to a radiation passing through an object to have a radiation image of the object stored in the stimulable phosphor sheet (This step will hereinbelow be referred to as "object image recording".), image read-out is conducted by scanning the stimulable phosphor sheet carrying the radiation image stored therein by stimulating rays which cause the stimulable phosphor sheet to emit light in proportion to the stored radiation energy and by photoelectrically detecting the emitted light to obtain an electric image signal, and a visible image is reproduced by use of the electric image signal, the method of reproducing a radiation image comprising the steps of:

(i) conducting preliminary image recording by exposing said stimulable phosphor sheet to the radiation prior to said object image recording without making the radiation pass through the object, (ii) storing a preliminary image signal obtained by reading out the image stored in said stimulable phosphor sheet subjected to said preliminary image recording, and (iii) conducting reproduction of said visible image after said object image recording on the basis of an electric image signal obtained by subtracting said stored preliminary image signal multiplied by a predetermined constant from said electric image signal obtained by reading out the radiation image stored in said stimulable phosphor sheet.

The present invention also provides an apparatus for reproducing a radiation image in a radiation image recording and reproducing system in which object image recording is conducted by exposing a stimulable phosphor sheet to a radiation passing through an object to have a radiation image of the object stored in the stimulable phosphor sheet, image read-out is conducted by scanning the stimulable phosphor sheet carrying the radiation image stored therein by stimulating rays which cause the stimulable phosphor sheet to emit light in proportion to the stored radiation energy and by photoelectrically detecting the emitted light to obtain an electric image signal, and a visible image is reproduced by use of the electric image signal, which comprises:

(a) a storage means for storing a preliminary image signal obtained by image read-out from said stimulable phosphor sheet subjected to preliminary image recording conducted by exposing said stimulable phosphor sheet to the radiation prior to said object image recording without making the radiation pass through the object, (b) a multiplication means for multiplying an output image signal of said storage means by a predetermined constant, (c) a subtraction means for receiving said electric image signal obtained by said image read-out from said stimulable phosphor sheet subjected to said object image recording and an output image signal of said multiplication means, and calculating the difference between said two image signals, and (d) a reproduction means for reproducing said visible image on the basis of an output signal of said subtraction means.

In short, the present invention is characterized by conducting the preliminary image recording without making a radiation pass through an object prior to the object image recording, and reproducing a visible image of the object by use of an electric image signal obtained by subtracting the preliminary image signal based on the preliminary image recording from the electric image signal based on the object image recording.

As described above, in the present invention, a visible image is reproduced by use of a signal obtained by subtracting a preliminary image signal obtained in advance from the electric image signal based on object image recording.

Since the preliminary image signal is the one obtained by read-out of the stimulable phosphor sheet subjected to the preliminary image recording conducted without making a radiation pass through an object prior to the object image recording, the signal represents nonuniformity caused by the apparatus such as nonuniformity of sensitivity of the stimulable phosphor sheet and nonuniformity of light detecting efficiency of the read-out means.

Accordingly, by reproducing a visible image after subtracting the preliminary image signal from the electric image signal obtained by read-out of the stimulable phosphor sheet carrying a radiation image of an object stored therein, it is possible to eliminate or decrease deterioration of image quality based on nonuniformity caused by the apparatus, and to obtain a visible image having an improved image quality, particularly a high diagnostic efficiency and accuracy.

In order to store all preliminary image signals detected from many stimulable phosphor sheets, an expensive storage unit of a large capacity is necessary. However, in a built-in type radiation image recording and reproducing system proposed in Japanese Patent Application No. 58(1983)-66730 wherein an image recording section, an image read-out section and an erasing section are arranged along a path for conveying and circulating the stimulable phosphor sheets and the stimulable phosphor sheets are circulated and reused for image recording and read-out, it is not necessary to use so many stimulable phosphor sheets and an expensive storage unit of a large capacity. Therefore, the method and apparatus of the present invention are applicable particularly advantageously to the built-in type radiation image recording and reproducing system.

Further, in the present invention, since problems caused by nonuniformity of sensitivity of the stimulable phosphor sheet can be eliminated at the reproducing step, it is possible to widen the allowable range of nonuniformity of the sensitivity of the stimulable phosphor sheet thereby to improve the yield in the manufacture thereof.

BRIEF DESCRIPTION OF THE DRAWING

The single drawing is a schematic view showing an embodiment of the method and apparatus for reproducing a radiation image in accordance with the present invention.

DESCRIPTION OF THE PREFERRED EMBODIMENTS

The present invention will hereinbelow be described in further detail with reference to the accompanying drawing.

In the drawing, reference numerals 1a, 1b and 1c denote an image recording step, a read-out step and an erasing step in the preliminary image recording and read-out process. Reference numerals 2a, 2b and 2c denote an image recording step, a read-out step and an erasing step in the object image recording and read-out process.

At the image recording step 1a in the preliminary image recording and read-out process, a stimulable phosphor sheet 5 is exposed directly to a radiation emitted by a radiation source 3 to have a preliminary radiation image information stored in the sheet 5.

The stimulable phosphor sheet 5 is then sent to the read-out step 1b at which the sheet 5 is scanned by stimulating rays such as a laser beam emitted by a stimulating ray source 6. Light emitted by the stimulable phosphor sheet 5 in proportion to the stored radiation energy when it is exposed to stimulating rays is photoelectrically detected by a photoelectric conversion means 7 to obtain a preliminary image signal. The preliminary image signal is stored in a storage means 9.

At the erasing step 1c, the stimulable phosphor sheet 5 is exposed to erasing light emitted by an erasing means 10 such as a fluorescent lamp, a tungsten-filament lamp, a sodium lamp, a xenon lamp or an iodine lamp, and radiation energy remaining in the sheet 5 is erased.

Then, the stimulable phosphor sheet 5 is sent to the image recording step 2a in the object image recording and read-out process at which the sheet 5 is exposed to the radiation emitted by the stimulating ray source and passing through an object 4 to have a radiation image of the object stored in the sheet 5.

At the read-out step 2b, image read-out from the stimulable phosphor sheet 5 is conducted in the same manner as in the read-out step 1b in the preliminary image recording and read-out process, and an object image signal is obtained. Then, a visible image of the object is reproduced by a reproducing means 8 on the basis of the object image signal. The image reproduction is conducted by use of an image signal obtained by subtracting from the object image signal an image signal obtained by multiplying the stored preliminary image signal by a predetermined constant. At this time, the multiplication is conducted by a multiplication means 11 constituted by a multiplier or the like, and the subtraction is conducted by a subtraction means 12 constituted by a subtracter or the like.

After the read-out of the object image from the stimulable phosphor sheet 5, the sheet 5 is sent to the erasing step 2c in the object image recording and read-out process at which radiation energy remaining on the sheet 5 is erased in the same manner as in the erasing step 1c in the preliminary image recording and read-out process. Subsequently, a second object image recording and read-out process, a third object image recording and read-out process, . . . , are conducted by repeating the image recording, read-out, reproducing and erasing in the same manner as in the aforesaid object image recording and read-out process. Reproduction of a visible image in each process may be conducted by use of an image signal obtained by subtracting the originally stored preliminary image signal multiplied by the predetermined constant from an obtained object image signal in the same manner as in the first object image recording and read-out process shown in the drawing.

In the subtraction between the image signals for reproduction of a visible image of the object, a signal of each picture element obtained by multiplying the aforesaid preliminary image signal by the predetermined constant may be subtracted from the object image signal of the corresponding picture element.

The predetermined constant by which the preliminary image signal is multipled may be selected as desired in accordance with, for example, the ratio of the read-out latitude in image read-out after the preliminary image recording to the read-out latitude in image read-out after the object image recording.

We claim:

1. A method of reproducing a radiation image in a radiation image recording and reproducing system in which object image recording is conducted by exposing a stimulable phosphor sheet to a radiation passing through an object to have a radiation image of the object stored in the stimulable phosphor sheet, image read-out is conducted by scanning the stimulable phosphor sheet carrying the radiation image stored therein by stimulating rays which cause the stimulable phosphor sheet to emit light in proportion to the stored radiation energy and by photoelectrically detecting the emitted light to obtain an electric image signal, and a visible image is reproduced by use of the electric image signal, the method of reproducing a radiation image comprising the steps of:

(i) conducting preliminary image recording by exposing said stimulable phosphor sheet to the radiation prior to said object image recording without making the radiation pass through the object,
   (ii) storing a preliminary image signal obtained by reading out the image stored in said stimulable phosphor sheet subjected to said preliminary image recording, and
   (iii) conducting reproduction of said visible image after said object image recording on the basis of an electric image signal obtained by subtracting said stored preliminary image signal multiplied by a predetermined constant from said electric image signal obtained by said read-out of said radiation image stored by said step (ii).

2. A method as defined in claim 1 wherein said radiation image recording and reproducing system comprises the steps of erasing radiation energy remaining in said stimulable phosphor sheet after said image read-out from said stimulable phosphor sheet is conducted and reusing the erased stimulable phosphor sheet for radiation image recording, and said preliminary image recording is conducted prior to the first object image recording on said stimulable phosphor sheet.

3. A method as defined in claim 1 or 2 wherein said predetermined constant is selected in accordance with a ratio of a read-out latitude in said image read-out after said preliminary image recording to a read-out latitude in said image read-out after said object image recording.

4. An apparatus for reproducing a radiation image in a radiation image recording and reproducing system in which object image recording is conducted by exposing a stimulable phosphor sheet to a radiation passing through an object to have a radiation image of the object stored in the stimulable phosphor sheet, image read-out is conducted by scanning the stimulable phosphor sheet carrying the radiation image stored therein by stimulating rays which cause the stimulable phosphor sheet to emit light in proportion to the stored radiation energy and by photoelectrically detecting the emitted light to obtain an electric image signal, and a visible image is reproduced by use of the electric image signal, the apparatus for reproducing a radiation image comprising:

(a) a storage means for storing a preliminary image signal obtained by image read-out from said stimulable phosphor sheet subjected to preliminary image recording conducted by exposing said stimulable phosphor sheet to the radiation prior to said object image recording without making the radiation pass through the object,
   (b) a multiplication means for multiplying an output image signal of said storage means by a predetermined constant,
   (c) a subtraction means for receiving said electric image signal obtained by said image read-out from said stimulable phosphor sheet subjected to said object image recording and an output image signal of said multiplication means, and calculating the difference between said two image signals, and
   (d) a reproduction means for reproducing said visible image on the basis of an output signal of said subtraction means.

5. An apparatus as defined in claim 4 wherein said radiation image recording and reproducing system is provided with a means for erasing radiation energy remaining in said stimulable phosphor sheet after said image readout from said stimulable phosphor sheet is conducted, and a means for circulating and reusing said erased stimulable phosphor sheet for radiation image recording.

* * * * *